United States Patent
Chu et al.

(10) Patent No.: US 6,908,116 B2
(45) Date of Patent: Jun. 21, 2005

(54) FIXATION CLAMP DEVICE FOR HOSE FITTINGS

(76) Inventors: Henry C. Chu, 133 N. Lemon St., Orange, CA (US) 92866; Ralph R. Edwards, 353 W. Clarktown Rd., New City, NY (US) 10956

(*) Notice: Subject to any disclaimer, the term of this patent is extended or adjusted under 35 U.S.C. 154(b) by 0 days.

(21) Appl. No.: 10/722,660

(22) Filed: Nov. 25, 2003

(65) Prior Publication Data

US 2005/0110269 A1 May 26, 2005

(51) Int. Cl.[7] .............................................. F16L 35/00
(52) U.S. Cl. ............................ 285/39; 285/61; 285/64; 285/420
(58) Field of Search .............................. 285/198, 420, 285/39, 61, 64

(56) References Cited

U.S. PATENT DOCUMENTS

| | | | | |
|---|---|---|---|---|
| 111,018 | A | * | 1/1871 | Thompson ................. 285/180 |
| 422,242 | A | * | 2/1890 | Morris ....................... 285/198 |
| 642,489 | A | | 1/1900 | Pyke |
| 1,026,066 | A | * | 5/1912 | Wolf ......................... 285/198 |
| 1,484,108 | A | * | 2/1924 | Zoltowski .................. 285/198 |
| 1,545,493 | A | * | 7/1925 | Hoffman .................... 285/198 |
| 2,484,755 | A | | 10/1949 | Smith |
| 3,115,889 | A | * | 12/1963 | Franck et al. .............. 137/318 |
| 3,788,345 | A | * | 1/1974 | Tura .......................... 137/318 |
| 4,015,865 | A | * | 4/1977 | Kongelka ................... 285/198 |
| 4,108,474 | A | | 8/1978 | Sigrist ........................ 285/12 |
| 4,157,195 | A | * | 6/1979 | Costanzo et al. ............. 285/4 |
| 4,506,917 | A | * | 3/1985 | Hansen Arne ................ 285/4 |
| 4,625,999 | A | | 12/1986 | Valentine et al. ............ 285/24 |
| 4,872,641 | A | * | 10/1989 | Fangrow, Jr. .............. 251/148 |

FOREIGN PATENT DOCUMENTS

| | | | | |
|---|---|---|---|---|
| DE | 908327 | * | 4/1954 | ................ 285/198 |
| GB | 377832 | * | 8/1932 | ................ 285/198 |
| GB | 2063405 | * | 6/1981 | ................ 285/198 |
| SU | 653478 | * | 3/1979 | ................ 285/198 |

* cited by examiner

Primary Examiner—Eric K. Nicholson
(74) Attorney, Agent, or Firm—Charles E. Baxley

(57) ABSTRACT

A fixation clamp device includes a bracket having two flaps extended from a base plate which has a channel, and a block slidably coupled along the channel of the base plate with a fastener. The block includes a mouth and a port communicating with a bore, a fitting is engaged onto one of the flaps and coupled to the port of the block. A forcing device may force the block against the fitting. A gasket may be engaged between the port of the block and the fitting, and may include one end engaged into the port of the block. One or more further fittings may be selectively engaged onto the bracket, and coupled to the port of the block.

8 Claims, 5 Drawing Sheets

FIXATION CLAMP DEVICE FOR HOSE FITTINGS

BACKGROUND OF THE INVENTION

1. Field of the Invention

The present invention relates to a fixation clamp device, and more particularly to a fixation clamp device for adjustably coupling hoses and/or hose fittings together.

2. Description of the Prior Art

For cleaning pipes or conduits or the like, various kinds of typical fixation clamp devices have been provided to couple and secure the pipes or conduits to a water source, for allowing water or detergent to flow through the pipes or conduits, in order to clean the pipes or conduits.

For example, U.S. Pat. No. 642,489 to Pyke discloses one of the typical fixation clamp devices and comprise a U-clamp to clamp and to couple the tobacco pipes to water sources. However, the typical fixation clamp devices may not be used to solidly couple pipes or conduits having pressurized air or fluid flown therethrough.

U.S. Pat. No. 2,484,755 to Smith discloses another typical fixation clamp device comprising a U-clamp to clamp and to couple a water meter to water sources. However, the typical fixation clamp devices also may not be used to solidly couple pipes or conduits having pressurized air or fluid flown therethrough.

U.S. Pat. No. 4,108,474 to Sigrist discloses a further typical fixation clamp device comprising a U-shaped clip to clamp and to couple two pipes or hoses together. However, the typical fixation clamp devices also may not be used to solidly couple pipes or conduits having pressurized air or fluid flown therethrough.

U.S. Pat. No. 4,625,999 to Valentine et al. discloses a still further typical fixation clamp device comprising a ball joint connector to couple two pipes or hoses together. However, the typical fixation clamp devices also may not be used to solidly and adjustably couple pipes or conduits together.

The present invention has arisen to mitigate and/or obviate the afore-described disadvantages of the conventional fixation clamp devices.

SUMMARY OF THE INVENTION

The primary objective of the present invention is to provide a fixation clamp device for solidly and adjustably coupling hoses and/or hose fittings together.

In accordance with one aspect of the invention, there is provided a fixation clamp device comprising a bracket including a base plate, and a first flap and a second flap extended from the base plate, to define a space therebetween, the base plate of the bracket including a channel formed therein, a block slidably received in the space defined between the first and the second flaps of the bracket, and including a bore formed therein, and including a mouth and a port provided therein and communicating with the bore thereof, a fitting engaged onto the second flap of the bracket, and coupled to the port of the block. A forcing device may be used for forcing the block against the fitting, to couple the fitting to the block, and a slidably adjusting device may be used for slidably adjusting the block along the channel of the base plate of the bracket.

The second flap of the bracket includes a notch formed therein to receive the fitting, and to anchor the fitting to the bracket.

The forcing device includes a fastener threaded to the first flap of the bracket, and engaged with the block, to force and to adjust the block along the channel of the base plate of the bracket by threading the fastener relative to the first flap of the bracket. The block includes a depression formed therein, the fastener includes a first end rotatably engaged into the depression of the block.

The slidably adjusting device includes a fastener slidably engaged through the channel of the base plate of the bracket, and threaded to the block. The block includes a screw hole formed therein, for threading to the fastener, and to adjustably secure the block to the bracket.

A gasket may further be provided and engaged between the port of the block and the fitting. The gasket includes a first end engaged into the port of the block, and includes an orifice formed therein and communicating with the bore of the block.

One or more further fittings may further be provided and selectively engaged onto the second flap of the bracket, and coupled to the port of the block, when the fitting is disengaged from the second flap of the bracket and the port of the block.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
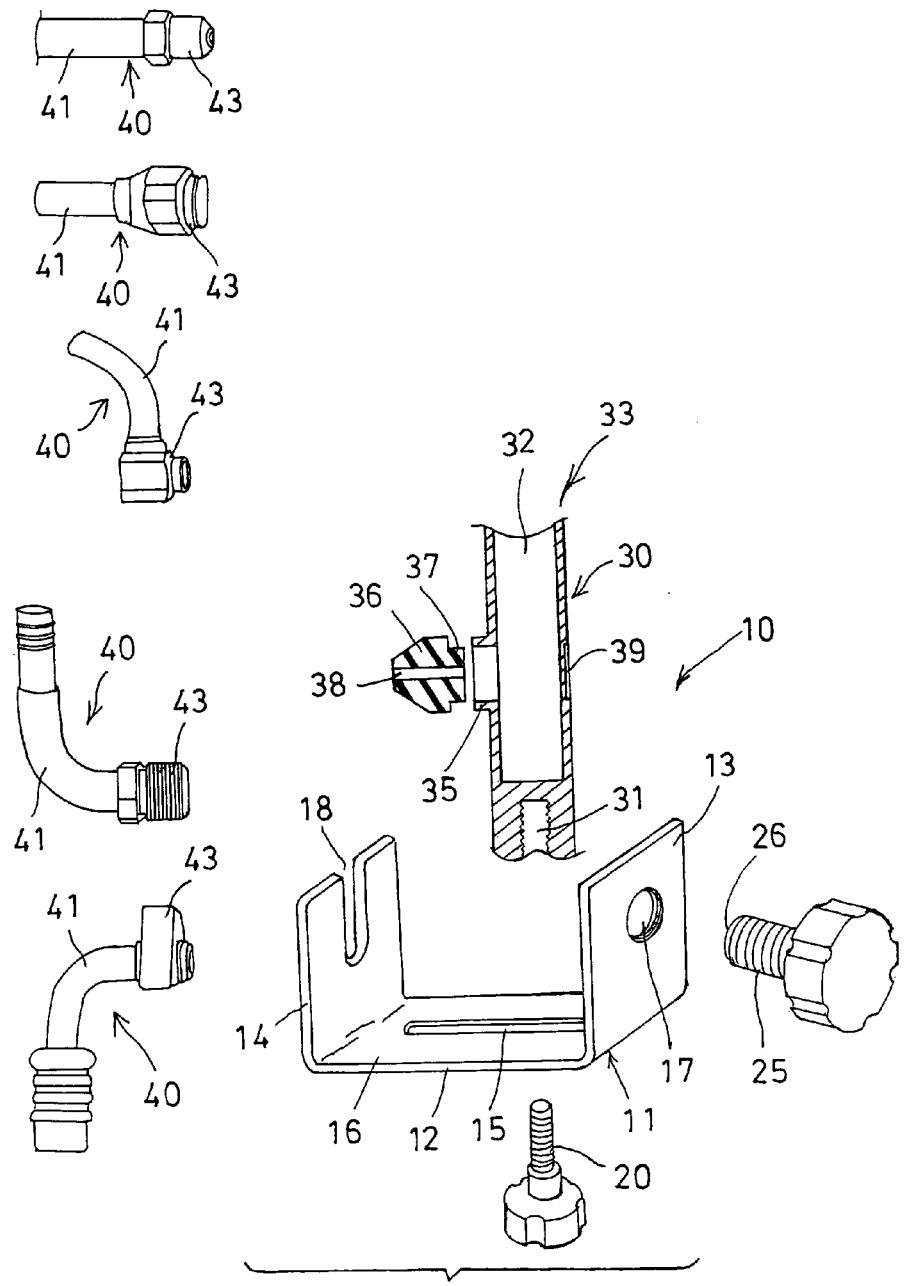
FIG. 1 is an exploded view of a fixation clamp device in accordance with the present invention.
Figure 2:
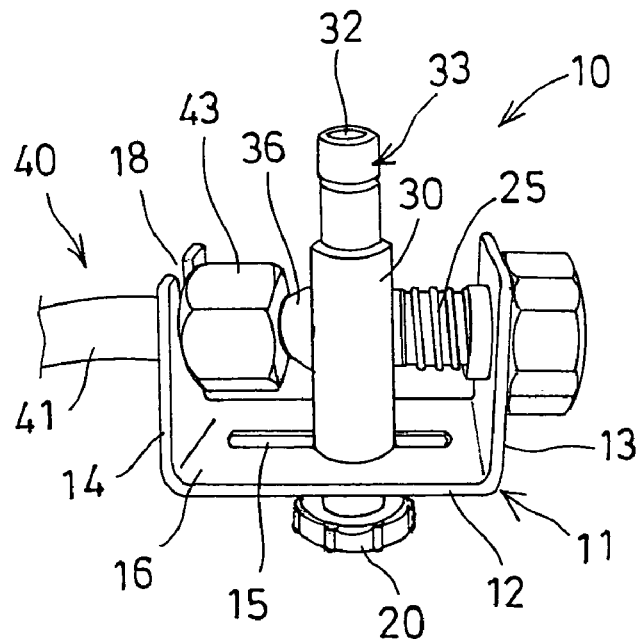
FIG. 2 is a partial perspective view of the fixation clamp device.
Figure 3:
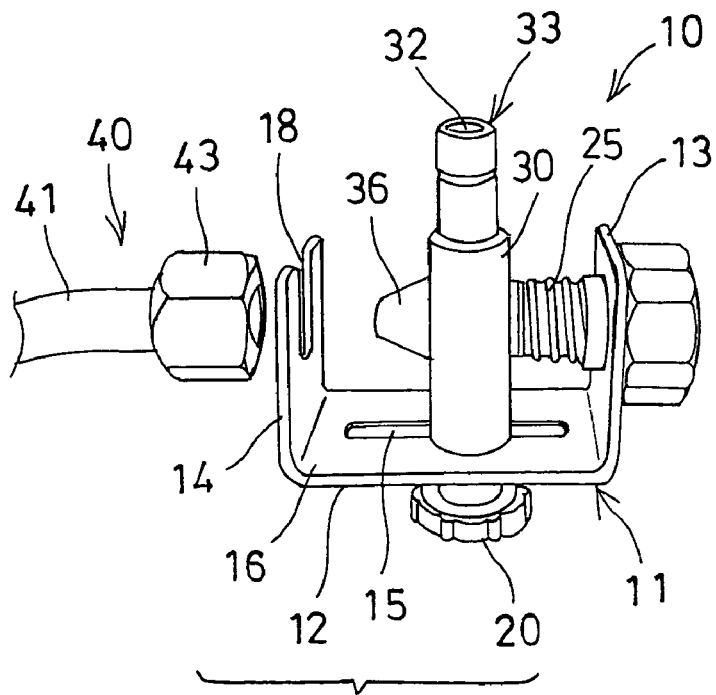
FIG. 3 is a partial exploded view of the fixation clamp device.
Figure 5:
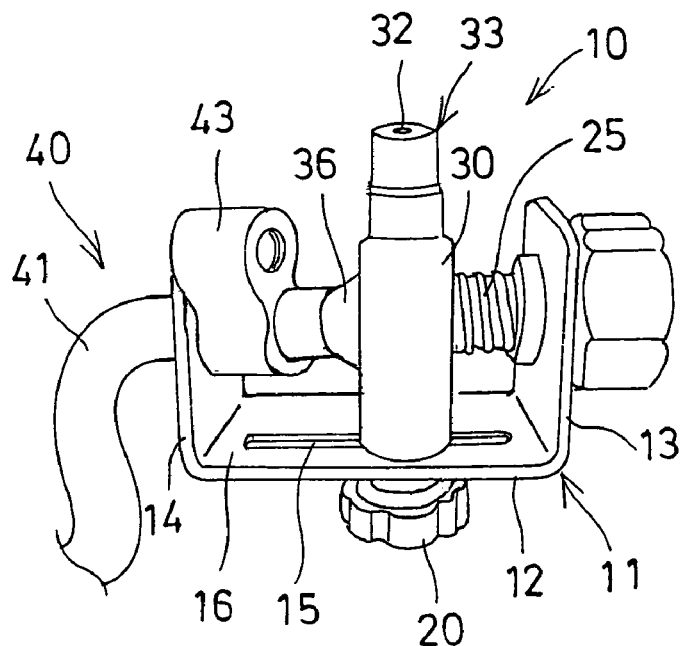
FIGS. 4, 5, 6 are partial perspective views similar to FIG. 2, illustrating the other arrangements of the fixation clamp device.
Figure 4:
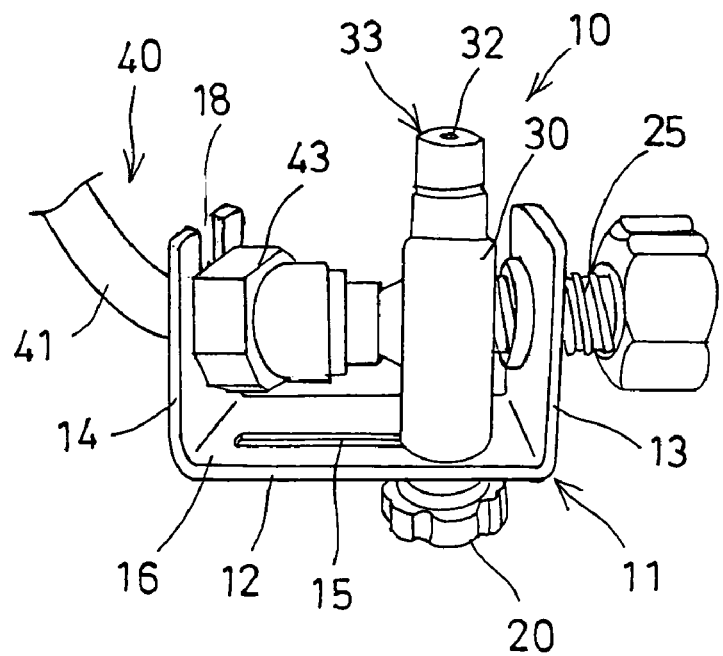

Referring to the drawings, and initially to FIGS. 1–3, a fixation clamp device in accordance with the present invention is generally indicated with a reference numeral "10" and comprises a U-shaped bracket 11 including a base plate 12, and two flaps 13, 14 extended from two ends of the base plate 12, and preferably perpendicular to the base plate 12, to form or define a space 16 in the bracket 11 and between the flaps 13, 14. The base plate 12 includes a longitudinal channel 15 formed therein for slidably receiving a fastener 20 therein. One of the flaps 13 includes a screw hole 17 formed therein, and the other flap 14 includes a notch 18 formed therein.

Figure 7:
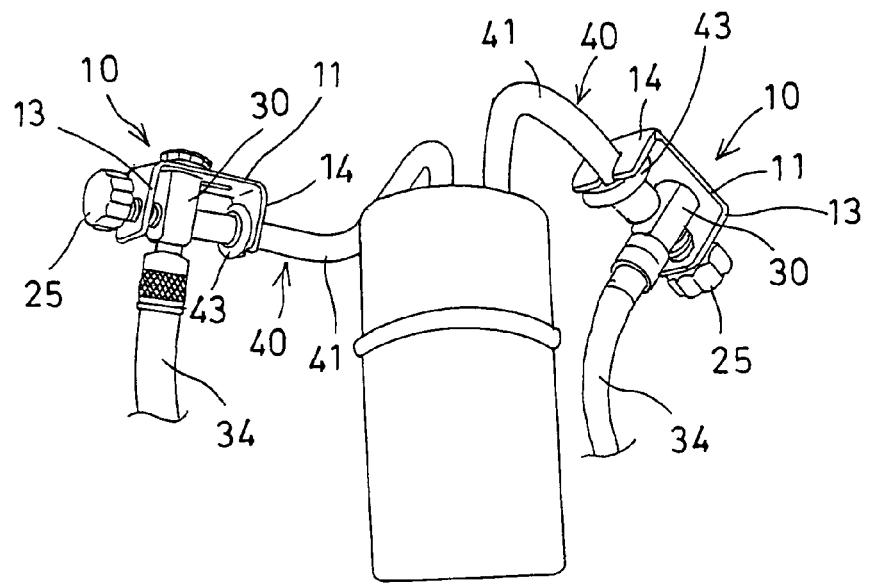
FIG. 7 is a partial perspective view illustrating the operation of the fixation clamp device.
Figure 6:
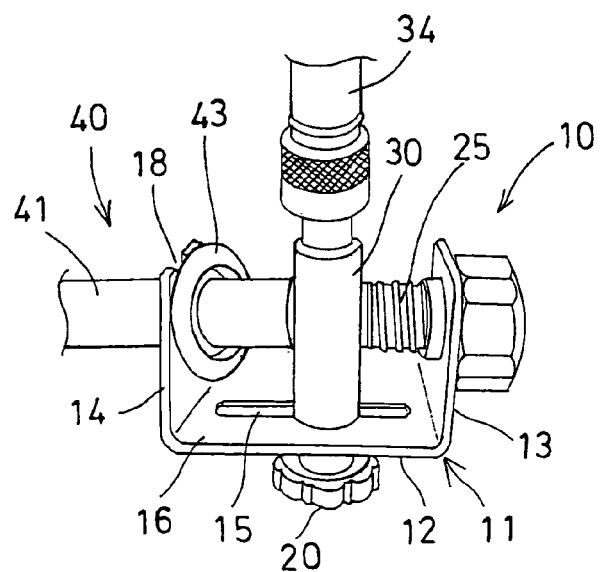

A block 30 includes a screw hole 31 formed therein for selectively threading to the fastener 20, so as to be movably or adjustably secured to the bracket 11. The block 30 includes a bore 32 formed therein, and includes one end or a mouth 33 formed or provided on the one end thereof for coupling to various facilities (not shown) with a hose 34 (FIG. 7). The block 30 further includes a port 35 formed therein and communicating with the bore 32 thereof.

One or more plugs or gaskets 36 may each include one end 37 engaged into the port 35, for attaching to the block 30 with such as force-fitted engagements, and may each include an orifice 38 formed therein for communicating with the bore 32 of the block 30. Another fastener 25 may be threaded with the screw hole 17 of the flap 13 of the bracket 11, and may be engaged with the block 30 (FIGS. 2–9), for moving or adjusting the block 30 along the longitudinal channel 15 of the base plate 12.

It is preferable that the block 30 includes a depression 39 formed therein (FIG. 1), for rotatably receiving one end 26 of the fastener 25, and thus for allowing the block 30 to be smoothly and stably moved or adjusted along the longitudinal channel 15 of the base plate 12 by the fastener 25.

The fixation clamp device 10 further includes one or more adapters or hose end fittings 40 each having a tube 41 engageable or insertable into the notch 18 of the flap 14 of the bracket 11, and a coupler 43 formed or provided on one end of the tube 41, for engaging with the flap 14 (FIGS. 2–9), and thus for selectively and solidly securing or anchoring either of the fittings 40 to the bracket 11. The fittings 40 may be coupled to hoses (not shown), or to accumulators 50 (FIG. 7) or the like.

In operation, as shown in FIGS. 2–9, the tubes 41 of various fittings 40 may be engaged or inserted into the notch 18 of the flap 14 of the bracket 11, and the coupler 43 of the fittings 40 may be engaged with the flap 14, and engaged with the gasket 36, to selectively couple either of the fittings 40 to the block 30. The fastener 25 may then force the block 30 against the fittings 40, in order to solidly and adjustably and selectively secure and anchor either of the fittings 40 to the block 30 and the bracket 11.

Figure 8:
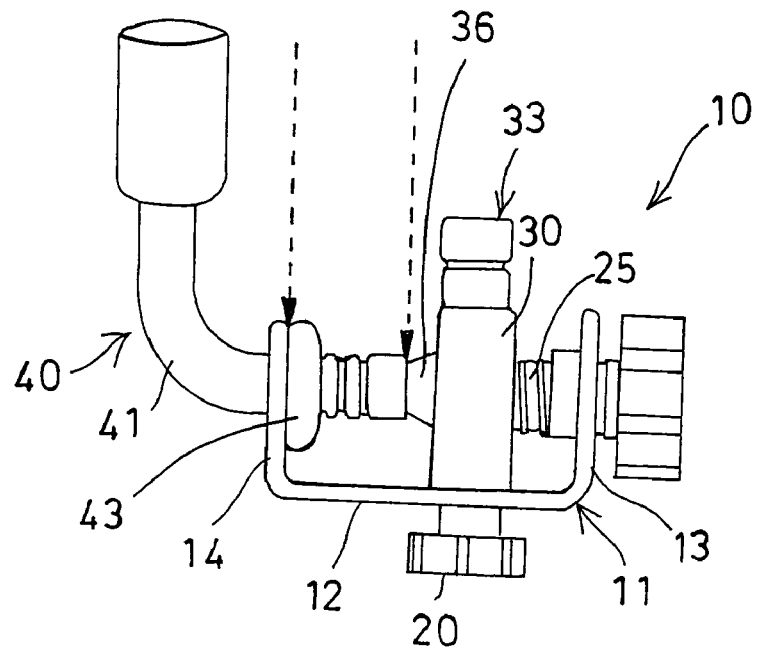
FIGS. 8 and 9 are partial perspective views similar to FIGS. 2 and 4–6, illustrating the operation of the fixation clamp device.
Figure 9:
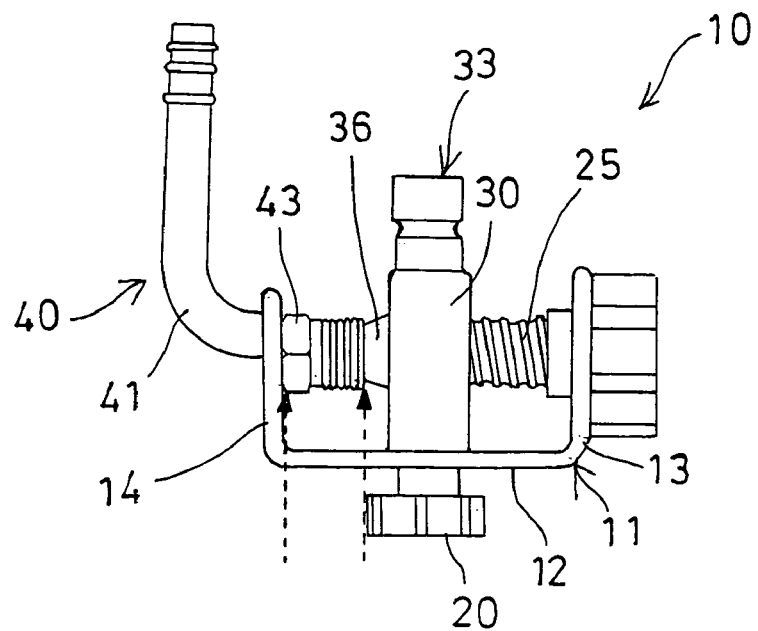

As best shown in FIGS. 2 and 8–9, when different or various fittings 40 are attached to the bracket 11, the couplers 43 of the fittings 40 may include different lengths or thicknesses. The block 30 may be moved or adjusted and forced against the fittings 40 by the fastener 25, to allow different fittings 40 to be solidly and adjustably and selectively secured and anchored to the block 30 and the bracket 11. The fastener 20 may then be threaded to force the block 30 toward the base plate 12 of the bracket 11, to further solidly secure the block 30 to the bracket 11.

It is to be noted that, while doing flushing or leakage testing, various hose end fittings are required to be solidly coupled together, to allow pressurized air or fluid, that may include extremely high pressure, to flow through the hoses and the hose end fittings. Accordingly, it is important that the hose end fittings are required to be solidly coupled together to prevent the hose end fittings from popping out or from falling off while installation.

Accordingly, the fixation clamp device in accordance with the present invention may be used for solidly and adjustably coupling hoses and/or hose fittings together.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A fixation clamp device comprising:
    a bracket including a base plate, and a first flap and a second flap extended from said base plate, to define a space therebetween, said base plate of said bracket including a channel formed therein,
    a block slidably received in said space defined between said first and said second flaps of said bracket, and including a bore formed therein, and including a mouth and a port provided therein and communicating with said bore thereof,
    a first fitting engaged onto said second flap of said bracket, and coupled to said port of said block,
    means for forcing said block against said first fitting, to couple said first fitting to said block, and
    means for slidably adjusting said block along said channel of said base plate of said bracket, said slidably adjusting means including a fastener slidably engaged through said channel of said base plate of said bracket, and threaded to said block.

2. The fixation clamp device as claimed in claim 1, wherein said second flap of said bracket includes a notch formed therein to receive said first fitting, and to anchor said first fitting to said bracket.

3. The fixation clamp device as claimed in claim 1, wherein said forcing means includes a fastener threaded to said first flap of said bracket, and engaged with said block, to force and to adjust said block along said channel of said base plate of said bracket by threading said fastener relative to said first flap of said bracket.

4. The fixation clamp device as claimed in claim 3, wherein said block includes a depression formed therein, said fastener includes a first end rotatably engaged into said depression of said block.

5. The fixation clamp device as claimed in claim 1, wherein said block includes a screw hole formed therein, for threading to said fastener, and to adjustably secure said block to said bracket.

6. The fixation clamp device as claimed in claim 1 further comprising a gasket engaged between said port of said block and said first fitting.

7. The fixation clamp device as claimed in claim 6, wherein said gasket includes a first end engaged into said port of said block, and includes an orifice formed therein and communicating with said bore of said block.

8. The fixation clamp device as claimed in claim 1 further comprising at least one second fitting selectively engaged onto said second flap of said bracket, and coupled to said port of said block, when said first fitting is disengaged from said second flap of said bracket and said port of said block.

* * * * *